Sept. 6, 1927.　　　　　　　　　　　　　　　　　　1,641,222
G. A. FOISY
MACHINE FOR MAKING TUBES AND SIMILAR ARTICLES
Filed Nov. 24, 1923　　　　3 Sheets-Sheet 1

Inventor:
George A. Foisy.
by Roberts, Roberts & Cushman
Attys.

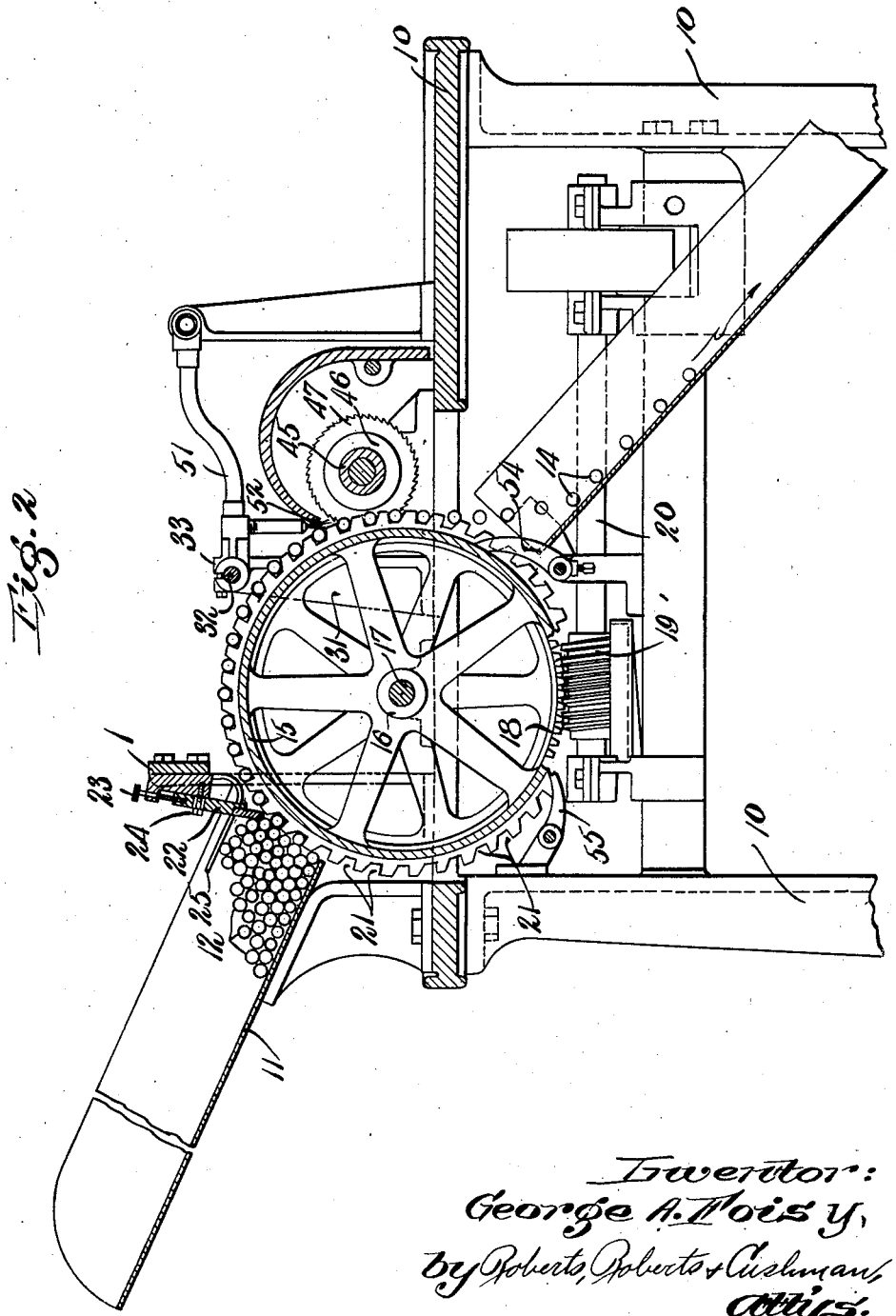

Sept. 6, 1927. 1,641,222
G. A. FOISY
MACHINE FOR MAKING TUBES AND SIMILAR ARTICLES
Filed Nov. 24, 1923 3 Sheets-Sheet 3
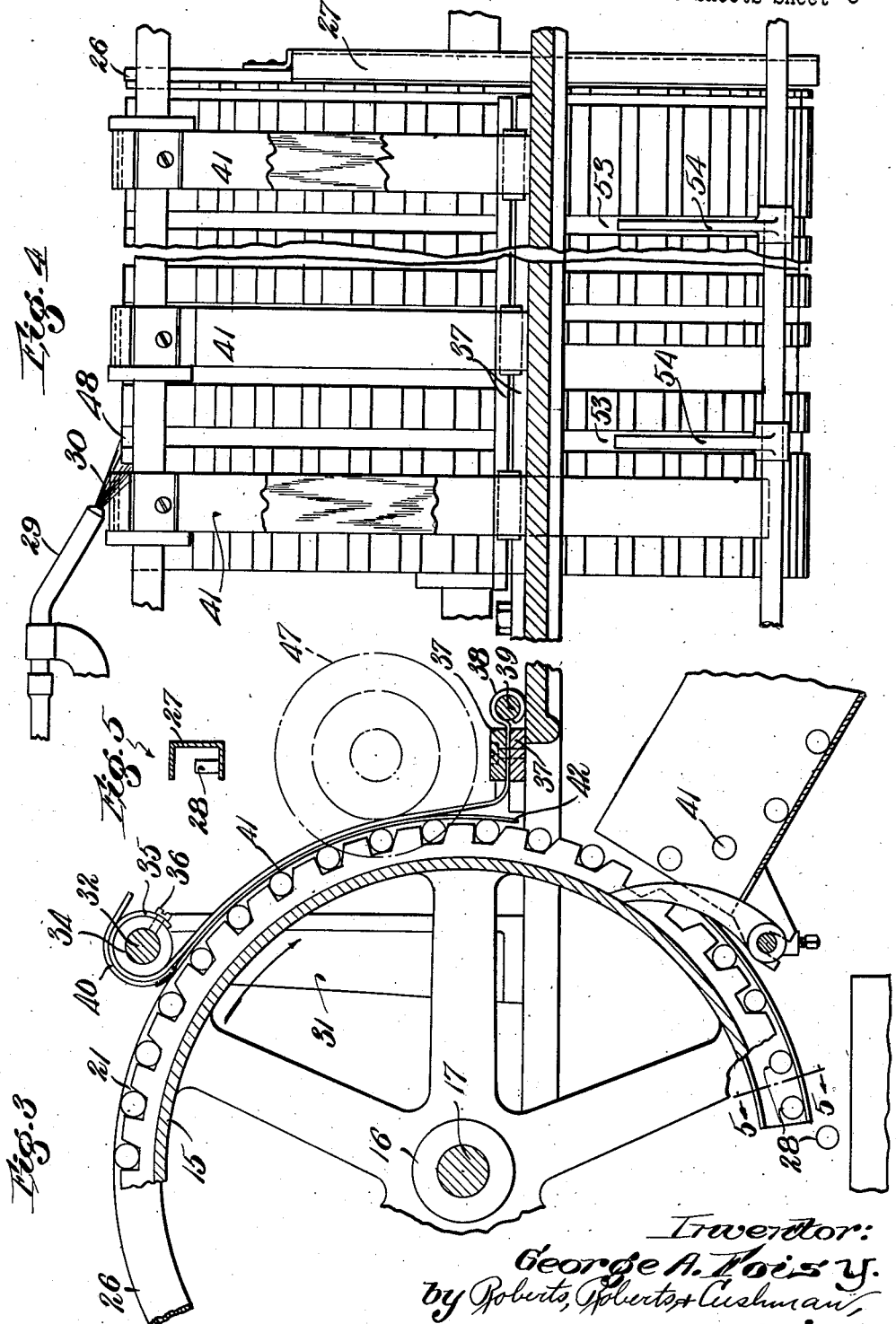

Patented Sept. 6, 1927.

1,641,222

UNITED STATES PATENT OFFICE.

GEORGE A. FOISY, OF LOWELL, MASSACHUSETTS, ASSIGNOR, BY MESNE ASSIGNMENTS, TO WINCHESTER REPEATING ARMS COMPANY, OF NEW HAVEN. CONNECTICUT, A CORPORATION OF CONNECTICUT.

MACHINE FOR MAKING TUBES AND SIMILAR ARTICLES.

Application filed November 24, 1923. Serial No. 676,761.

This invention relates to improvements in metal working machinery having particular reference to a machine for use in sawing or dividing elongate work pieces into a plurality of parts.

One of the purposes of the present invention is the provision of a machine which shall be automatic in operation in that it will selectively engage individual work units from a hopper containing a quantity of such units, will properly support said units, line them up to best advantage in the machine, present them to suitable cutting mechanism and subsequently discharge the cut or severed parts in different places or into different bins or receptacles and will separate the usable work pieces from the waste or scrap ends.

Other objects of the invention will be apparent by reference to the drawings taken in connection with the accompanying specification and claims, the drawings illustrating one form of embodiment of the principles of my invention.

Fig. 2 is a sectional view as on the line 2—2 of Fig. 1;

Fig. 3 is an enlarged fragmentary sectional view illustrating the work guiding members;

Fig. 4 is an enlarged fragmentary front elevation of the work carrier or conveyor and associated parts;

Fig. 5 is a section on the line 5—5 of Fig. 3; and

Figure 1:
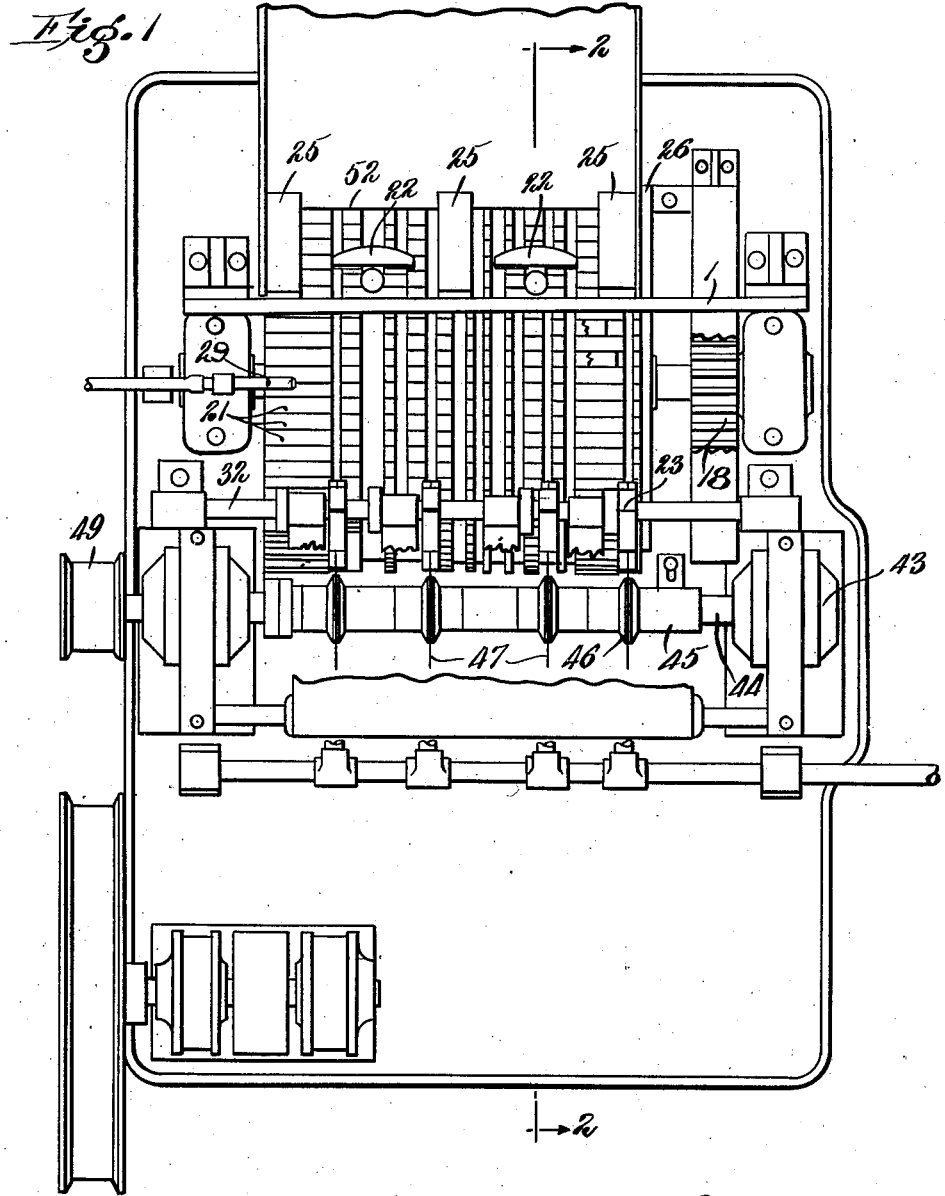
Fig. 1 is a plan view of the machine with parts broken away.
Figure 6:
Fig. 6 is a view of one form of work member.

In the drawings 10 designates the main frame of a machine embodying my invention having mounted thereon a hopper 11 for the work pieces which may be in the form of tubes 12. These tubes when produced by extrusion have the fragmentary end walls 13, as shown in Fig. 6. Tubes of the character here illustrated formed from very thin copper or the like are frequently employed in the manufacture of automobile radiators where a number of short sections are assembled together. One use of the present machine therefore is in the severing of a long tube such as 12 into a plurality of individual tube units or work pieces 14 of proper length and at the same time eliminate the defective or nonusable end portions 13.

In the accomplishment of this result I make use of a drum or carrier 15 having the hub portions 16 secured on the shaft 17, said shaft having a worm gear 18 meshing with the worm 19' of the drive shaft 20 for slow rotation. The drum is provided with the transversely extending grooves or recesses 21 to receive tubes or work pieces 12 from the hopper 11. An adjustable guide or gage member 22, carried by a portion of the frame 1, depends immediately adjacent the periphery of the drum holding back all but a single work piece from each of the recesses so that no extra pieces will be carried out of the hopper. This member is adjustable as by the swivel screw 23 and is locked in adjusted position by a set or clamp screw 24, guide fingers 25 cooperating with the member to limit riding up of the work pieces when the hopper is full.

The drum, as best illustrated in Fig. 4, rides at the right hand side of the machine against a guide plate 26 having a portion 27 of U-shape in cross section as indicated in Figs. 3 and 5 providing a channel in which the small sections 28 cut off the right hand ends of the tubes may ride downward away from the carrier into a suitable receptacle.

To properly line up the tubes for the cutting operation, I make use of a nozzle 29 directing an air blast as at 30 against the tubes as they rest at the top of the drum, the tubes being so light that the air blast will move them over until their ends rest and ride against the abutment plate 26.

Carried by the standards 31 adjacent the ends of the drum is the rod or shaft 32 which may be locked in rotatably adjusted position by tightening of the split bearing 33. This rod bears a plurality of collars 34 around which pass the tension bands 35 each secured in place by the screw 36 which passes through the collar into clamping engagement with the shaft 32 to retain the collar in desired rotatably adjusted position with respect to the shaft or rod. These tension bands extend downwardly a distance around the carrier and have their other ends extending outward between the clamp plates 37 and terminate in eyes 38 which receive the handle rods 39. It will be noted the tension of the bands may be adjusted either by movement of individual collars around the rod 32, by adjusting movement of individual lower ends between the clamp plates 37 when the latter are loosened, or by a rotating movement of the rod or shaft 32 in its bearings.

To secure the tubes in position in the grooves or channels of the carrier drum both during and subsequent to the severing operation, I make use of the hook-like members 40 which as shown fit over the bands and collars 34 and have suitably secured thereto the contact plates 41. These plates are curved to fit around the carrier being held tightly thereagainst at the cutting position, and extending predetermined distances beyond said position. For example, the central guide members preferably terminate substantially at the point 42 as indicated in Fig. 3 while the left hand end member is shown as extending through a considerably greater arc, thus retaining the severed tube section or end in place until the terminus of the band is reached when it is free to drop out of carrier groove. In this manner, by varying the length of the guide members 41, I readily control the discharge of the severed tube sections of any particular row.

To perform the cutting operation, I journal in suitable bearings as at 43, the shaft 44 provided with the spacing members 45 and clamping flanges 46 between which are secured the saws or cutters 47. The saws are designed to operate in the circumferential grooves 48 of the carrier drum, these circumferential grooves being greater in depth than the depth of the work receiving grooves 21 so that the saws may pass down into these grooves and will entirely sever the tubes or work pieces 12 into the desired number of parts of exactly prescribed length. Power for the sawing operation is applied to the saw shaft by means of the belt pulley 49 driven from a suitable source of power.

Connections 51 are provided for directing a pneumatic or other blast as at 52 against the saw and work at their point of operative engagement to clear away chips and to prevent any tendency toward overheating of the parts during the cutting operation.

The parts having been suitably severed it is desirable that they be positively removed from the carrier or that the removal be positively insured so that there will be no clogging up or interfering with the operation of the machine on the next revolution. In the accomplishment of this result, I mount either in the saw grooves or in suitable supplemental annular grooves 53 intermediate the saw grooves the cam-like ejector fingers 54. These fingers as illustrated in Fig. 2 ride in the bottom of the grooves so that if any tubes stick in the transverse passages as they are brought around they will ride up on the inclined or cam surface of the finger and be forced out to drop into their proper receptacle.

A supplemental ejector finger 55 of similar construction is disposed toward the rear of the machine to cooperate with end or waste portions carried around toward the rear of the machine by the extension on the longer guide shoe or shoes 41 so that these parts will be positively removed from the carrier. Thus the grooves as they move upward into the hopper will be unobstructed so that each groove may properly receive a tube to be operated upon by the machine.

While I have shown and described a specific embodiment of the invention I do not wish to be limited to the shape, size and arrangement of the parts herein shown and described but merely by the scope of the appended claims.

I claim:

1. A machine of the character described including a carrier drum having transversely extending recesses and annular grooves, an arbor adjacent the carrier having a plurality of cutters normally projecting into certain of the grooves to a greater depth than said recesses for severing articles held within the recesses, and curved guides substantially parallel with the outer surface of said drum for holding articles in position in the recesses during the cutting operation.

2. A machine of the character described including a carrier drum having longitudinal recesses and annular grooves, an arbor adjacent the carrier having a plurality of cutters normally projecting into certain of the grooves to a greater depth than said recesses for severing articles held within the recesses, curved guides substantially parallel with the outer surface of said drum for holding articles in position in the recesses during the cutting operation, and means operating in certain of the annular grooves for ejecting work pieces from the recesses.

3. A machine of the character described including a carrier drum, an end stop adjacent to said drum, means for automatically depositing articles on said carrier drum, means for shifting the articles thereon into engagement with said end stop, means for securing the shifted articles in adjusted position on said carrier, and means of severing the articles while so held.

4. A machine of the character described including a carrier drum, an end stop adjacent the drum, means for shifting articles on the carrier into engagement with the stop means for securing the shifted articles in adjusted position on the carrier and means for severing the articles while so held, said holding means varying in length to control the discharge of the articles.

5. A device of the character described including a carrier drum, a plurality of tension bands adjacent the drum for cooperation with a portion of the periphery thereof; and contact shoes loosely interposed between the drum and bands, said contact shoes being of different lengths substantially as and for the purpose described.

6. In a machine of the character described, a rotary conveyor drum, tension bands disposed adjacent the drum, means for individually or collectively adjusting the tension of the bands and contact shoes disposed between the bands and drum for engaging work carried by the latter.

7. A device of the character described including a conveyor drum, means for severing articles held by the drum and means for directing the severed parts into different receptacles.

8. A device of the character described including a conveyor drum, means for severing articles held by the drum and means for directing the severed parts into different receptacles, said means including an end chute for terminal portions of the stock.

9. A machine of the character described including a rotatable work supporting drum and pneumatic means for automatically shifting the work on the drum to a predetermined position.

10. In a machine of the character described, a rotary conveyor drum, tension bands disposed adjacent to and substantially parallel with the drum, means for collectively adjusting the tension of the bands, and contact shoes disposed between the bands and drum for engaging work carried by the latter.

11. A machine of the character described including a supporting member, and means for positioning the work thereon by subjecting the work to a blast of fluid in the desired direction of motion.

12. A machine of the character described including a work supporting member, and means for positioning the work thereon by subjecting a peripheral surface extending in the desired direction of movement to a blast of fluid.

13. A machine of the character described including a carrier, an end stop adjacent the carrier, means for shifting articles on the carrier into engagement with the end stop, means for securing the shifted articles in adjusted position on the carrier, and means for severing the articles so held, said securing means permitting discharge of the severed portions after different intervals of travel.

14. A machine of the character described including a carrier, means for severing articles carried by said carrier into a plurality of parts, and means for preventing dislodgment of said articles before and after severance releasing the severed portions at different points in their travel.

Signed by me at Lowell, Massachusetts, this 21st day of November, 1923.

GEO. A. FOISY.